(12) United States Patent
Wang et al.

(10) Patent No.: US 11,741,595 B2
(45) Date of Patent: Aug. 29, 2023

(54) CONCEALED SUBSTANCE DETECTION WITH HYPERSPECTRAL IMAGING

(71) Applicant: CHEMIMAGE CORPORATION, Pittsburgh, PA (US)

(72) Inventors: Jihang Wang, Sewickley, PA (US); Evan Krieger, Pittsburgh, PA (US); Rick Beideman, Pittsburgh, PA (US); Lucas P. Zbur, Murrysville, PA (US)

(73) Assignee: CHEMIMAGE CORPORATION, Pittsburgh, PA (US)

( * ) Notice: Subject to any disclaimer, the term of this patent is extended or adjusted under 35 U.S.C. 154(b) by 30 days.

(21) Appl. No.: 17/241,834

(22) Filed: Apr. 27, 2021

(65) Prior Publication Data

US 2021/0334954 A1 Oct. 28, 2021

Related U.S. Application Data

(60) Provisional application No. 63/016,097, filed on Apr. 27, 2020.

(51) Int. Cl.
*G06T 7/00* (2017.01)
*G06T 5/20* (2006.01)

(52) U.S. Cl.
CPC .............. *G06T 7/0008* (2013.01); *G06T 5/20* (2013.01); *G06T 2207/10036* (2013.01); *G06T 2207/20084* (2013.01)

(58) Field of Classification Search
CPC ............ G06T 7/0008; G06T 5/20; G06T 2207/10036; G06T 2207/20084; G06T 2207/10024; G06T 2207/30124
See application file for complete search history.

(56) References Cited

U.S. PATENT DOCUMENTS

| 7,840,360 B1 * | 11/2010 | Micheels ................. G01J 3/42 |
| | | 382/142 |
| 8,193,500 B2 * | 6/2012 | Iwasaki ................. G01N 21/31 |
| | | 250/338.1 |
| 8,513,607 B2 * | 8/2013 | Ramaswamy .......... G01S 7/288 |
| | | 250/341.8 |
| 9,157,800 B2 | 10/2015 | Priore et al. |
| 9,651,533 B2 | 5/2017 | Islam |
| 9,658,104 B2 * | 5/2017 | Treado ................. G01J 3/0218 |

(Continued)

OTHER PUBLICATIONS

X. Hadoux, et al , "A Spectral-Spatial Approach for Hyperspectral Image Classification Using Spatial Regularization on Supervised Score Image," in IEEE Journal of Selected Topics in Applied Earth Observations and Remote Sensing, vol. 8, No. 6, pp. 2361-2369, Jun. 2015, doi: (Year: 2015).*

(Continued)

*Primary Examiner* — Andrae S Allison
(74) *Attorney, Agent, or Firm* — DLA Piper LLP (US)

(57) ABSTRACT

A drug screening system and methods of using the same are disclosed. The drug screening system identifies and highlights drugs or other contraband substances enclosed within mailpieces based on score imagery computed from selected wavelengths based on chemical signatures. A wide-field, multispectral short-wave infrared imaging system allows for dissolved, concealed drug screening of mailpieces that improve inspection efficiency and accuracy.

24 Claims, 7 Drawing Sheets

(56) References Cited

U.S. PATENT DOCUMENTS

| | | | | |
|---|---|---|---|---|
| 2007/0200566 | A1* | 8/2007 | Clark | G01V 5/0008 |
| | | | | 324/318 |
| 2007/0235658 | A1* | 10/2007 | Zimdars | G01N 21/3586 |
| | | | | 250/390.07 |
| 2010/0278441 | A1* | 11/2010 | Shashidhar | G01J 3/32 |
| | | | | 382/218 |
| 2011/0261351 | A1* | 10/2011 | Treado | G01N 21/39 |
| | | | | 356/73 |
| 2012/0134582 | A1* | 5/2012 | Treado | G01J 3/28 |
| | | | | 382/165 |
| 2012/0138820 | A1* | 6/2012 | Plese | G01N 21/65 |
| | | | | 250/200 |
| 2013/0050007 | A1* | 2/2013 | Ammar | G01S 7/412 |
| | | | | 367/93 |
| 2017/0089761 | A1 | 3/2017 | McQuilkin et al. | |
| 2018/0322623 | A1* | 11/2018 | Memo | G06T 7/0004 |

OTHER PUBLICATIONS

Redmon, Joseph, et al. "You only look once: Unified, real-time object detection." Proceedings of the IEEE conference on computer vision and pattern recognition. 2016. (Year: 2016).*

Sauvola, Jaakko, et al. "Adaptive document binarization." Proceedings of the Fourth International Conference on Document Analysis and Recognition. vol. 1. IEEE, 1997. (Year: 1997).*

Gomer et al, Standoff, Wide-Area Explosive andNarcotic Detection Using ShortwaveInfared Hyperspectral Imaging, Special Issues—Aug. 1, 2018, vol. 33, Spectroscopy (Year: 2018).*

Jihang Wang, et al, Treado, "Sprayed or soaked concealed drug detection using SWIR hyperspectral imaging," Proc. SPIE 11392, Algorithms, Technologies, and Applications for Multispectral and Hyperspectral Imagery XXVI, 113920O (Apr. 24, 2020); doi: 10.1117/12.2556903 (Year: 2020).*

Wang et al., "Sprayed or Soaked Concealed Drug Detection Using SWIR Hyperspectral Imaging," Apr. 24, 2020, Proceedings of SPIE, vol. 11392, pp. 1-11.

* cited by examiner

CONCEALED SUBSTANCE DETECTION WITH HYPERSPECTRAL IMAGING

CROSS-REFERENCE TO RELATED APPLICATIONS

This application claims priority to U.S. Provisional Application Ser. No. 63/016,097 filed on Apr. 27, 2020, the content of which is hereby incorporated by reference in its entirety.

FIELD

The smuggling of drugs into correctional facilities through postal mail is a major concern. Thus, all correctional facilities inspect postal mail for contraband using techniques that vary from facility to facility. Inspection is primarily performed by humans, and usually involves a mail inspector opening and visually reviewing the postal mail using a desk lamp or flashlight to inspect suspect regions or using a high intensity light box to locate concealed items Like most human processes, visual inspection of postal mail is prone to misclassification of mail containing a drug as a result of human fatigue, distractions and subjectivity, and techniques used to conceal the drug from human vision. Some facilities use drug dogs to inspect the mail, but dogs are expensive to maintain and, like humans, are prone to fatigue and distraction.

Recently, mail inspectors report increasing use of sophisticated techniques to hide drugs by dissolving the drugs into paper. However, testing techniques have struggled to keep pace. There is a need for a rapid, accurate, wide-field, non-destructive scanning method that can detect target compounds on postal mail or on other substrates.

SUMMARY

This summary is provided to comply with 37 C.F.R. § 1.73, requiring a summary of the invention briefly indicating the nature and substance of the invention. It is submitted with the understanding that it will not be used to interpret or limit the scope or meaning of the claims.

A drug screening system and methods of using the same are disclosed. The drug screening system identifies and highlights drugs or other contraband substances enclosed within mailpieces based on score imagery computed from selected wavelengths based on chemical signatures. A wide-field, multispectral short-wave infrared imaging system allows for dissolved, concealed drug screening of mailpieces that improve inspection efficiency and accuracy.

In one embodiment, there is a method of distinguishing a target from a background in a sample, the method comprising: generating a score image from a hyperspectral image, the hyperspectral image having been formed from photons that have interacted with a sample that includes the target and the background, performing anomaly detection on the score image to remove confusants and identify one or more anomalies in the score image, the confusants including one or more of text, graphics, or images, and classifying one or more anomalies as target or non-target.

In another embodiment, the method further comprises preprocessing the score image by one or more of removing isolated outlier pixels from the score image, substrate flat fielding the score image, hole detection and filling the score image, image orientation of the score image, or cropping the score image.

In another embodiment, the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

In another embodiment, the target is a drug and the non-target is a substance that is not a drug.

In another embodiment, the text, graphics, or images are removed by one or more of Niblack's approach, Sauvola's approach, or Bataineh's approach.

In another embodiment, classifying is performed with a trained neural network.

In another embodiment, classifying is performed based on a You Only Look Once (YOLO) detector.

In one embodiment, there is a system for distinguishing a target from a background in a sample, the system comprising a processor and a non-transitory computer readable medium that when executed, causes the processor to: generate a score image from a hyperspectral image, the hyperspectral image having been formed from photons that have interacted with a sample that includes the target and the background, perform anomaly detection on the score image to remove confusants and identify one or more anomalies in the score image, the confusants including one or more of text, graphics, or images, and classify one or more anomalies as target or non-target.

In another embodiment, the processor further preprocesses the score image by one or more of removing isolated outlier pixels from the score image, substrate flat fielding the score image, hole detection and filling the score image, image orientation of the score image, or cropping the score image.

In another embodiment, the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

In another embodiment, the target is a drug and the non-target is a substance that is not a drug.

In another embodiment, the text, graphics, or images are removed by one or more of Niblack's approach, Sauvola's approach, or Bataineh's approach.

In another embodiment, the processor classifies the one or more anomalies with a trained neural network.

In another embodiment, the processor classifies the one or more anomalies based on a You Only Look Once (YOLO) detector.

In one embodiment, there is a method of distinguishing a target from a background in a sample, the method comprising: forming a hyperspectral image from photons that have interacted with a sample that includes the target and the background, generating a score image from a hyperspectral image, performing anomaly detection on the score image to remove confusants and identify one or more anomalies in the score image, the confusants including one or more of text, graphics, or images, and classifying one or more anomalies as target or non-target.

In another embodiment, the method further comprises preprocessing the score image by one or more of removing isolated outlier pixels from the score image, substrate flat fielding the score image, hole detection and filling the score image, image orientation of the score image, or cropping the score image.

In another embodiment, the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

In another embodiment, the target is a drug and the non-target is a substance that is not a drug.

In another embodiment, the text, graphics, or images are removed by one or more of Niblack's approach, Sauvola's approach, or Bataineh's approach.

In another embodiment, classifying is performed with a trained neural network.

In another embodiment, classifying is performed based on a You Only Look Once (YOLO) detector.

In one embodiment, there is a system for distinguishing a target from a background in a sample, the system comprising a processor and a non-transitory computer readable medium that when executed, causes the processor to: form a hyperspectral image from photons that have interacted with a sample that includes the target and the background, generate a score image from the hyperspectral image, perform anomaly detection on the score image to remove confusants and identify one or more anomalies in the score image, the confusants including one or more of text, graphics, or images, and classify one or more anomalies as target or non-target.

In another embodiment, the processor further preprocesses the score image by one or more of removing isolated outlier pixels from the score image, substrate flat fielding the score image, hole detection and filling the score image, image orientation of the score image, or cropping the score image.

In another embodiment, the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

In another embodiment, the target is a drug and the non-target is a substance that is not a drug.

In another embodiment, the text, graphics, or images are removed by one or more of Niblack's approach, Sauvola's approach, or Bataineh's approach.

In another embodiment, the processor classifies the one or more anomalies with a trained neural network.

In another embodiment, the processor classifies the one or more anomalies based on a You Only Look Once (YOLO) detector.

DRAWINGS

Aspects, features, benefits and advantages of the embodiments described herein will be apparent with regard to the following description, appended claims, and accompanying drawings where:

DETAILED DESCRIPTION

Figure 1:
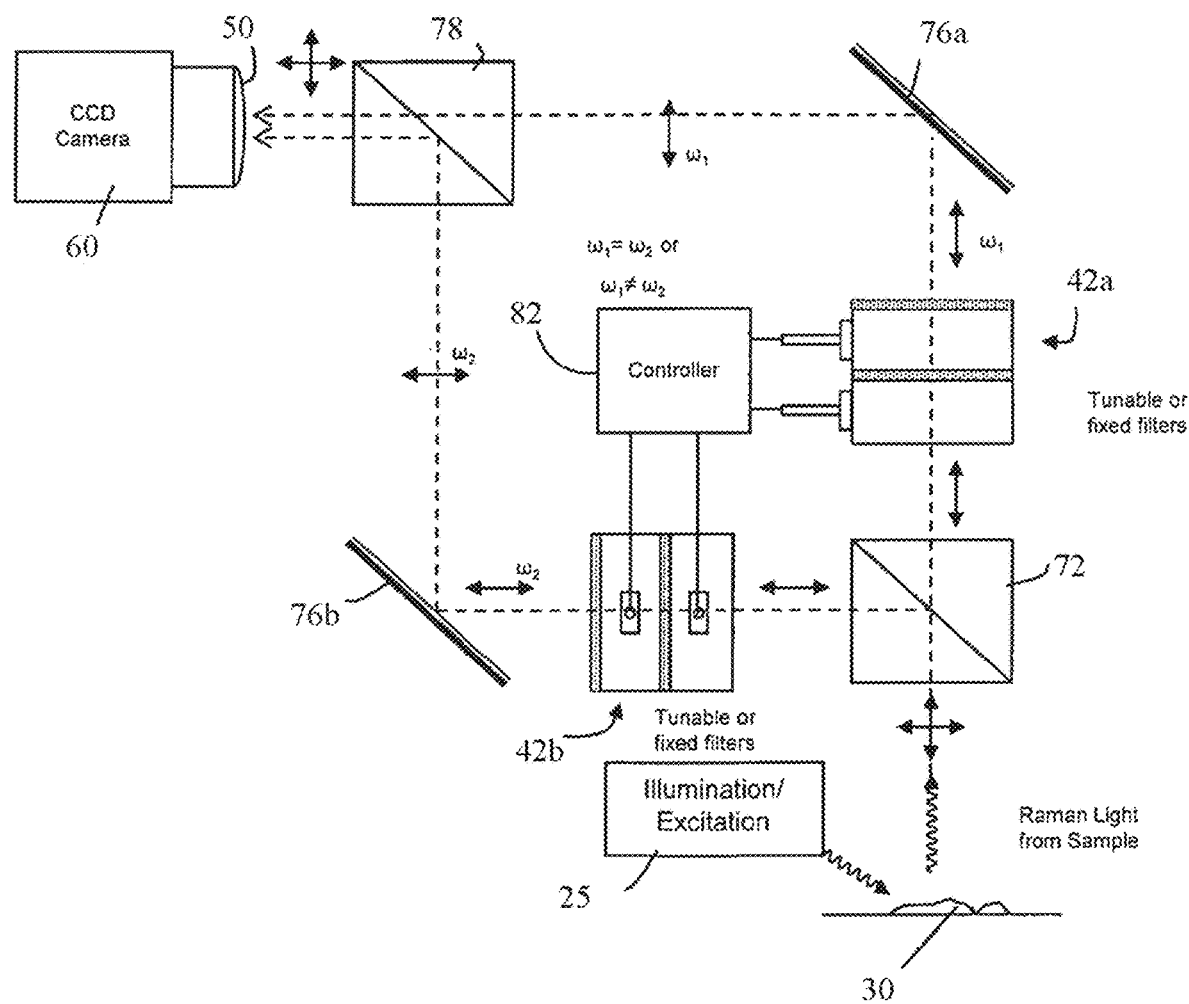
FIG. 1 depicts one embodiment of a detection apparatus, which is configured with a single camera and includes dual channels with dual polarization in accordance with an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, "target" or "target compound" means a single material of interest that is capable of being detected by spectral imaging. The target is not limited, and includes one or more of body tissues, body fluids, explosives, drugs, toxins, fruit, cheese, meat, alcohol, flavor compounds, Chemical Warfare Agents (CWA), Toxic Industrial Chemicals (TIC), and Non-Traditional Agents (NTA).

In certain embodiments the "target" or "target compound" is one or more drugs. Examples of drugs are not limited and include one or more of LSD, morphine, hydrocodone, oxycodone, hydromorphone, methadone, heroin, methaqualone, cocaine, methadone, phencyclidine, or methamphetamine. In some embodiments, the drugs are natural opioids or synthetic opioids. Examples of synthetic opioids include fentanyl and derivatives thereof, such as alpha-methylfentanyl, 3-methylthiofentanyl, acetyl-alpha-methylfentanyl, beta-hydroxy-3-methylfentanyl, alpha-methylthiofentanyl, thiofentanyl, beta-hydroxyfentanyl, para-fluorofentanyl, 3-methylfentanyl, acetyl fentanyl, butyryl fentanyl, beta-hydroxythiofentanyl, furanyl fentanyl, 4-fluoroisobutyryl fentanyl, acryl fentanyl, and U-47700.

Detection

In some embodiments, an image sensor is positioned in the optical path to collect interacted photons from at least one target. By way of example, the image sensor can include one or more imaging devices, such as a CCD detector, an InGaAs detector, a CMOS detector, an InSb detector, a MCT detector, or combinations thereof, although other types and/or numbers of image sensors may be employed. One or more optics, such as mirrors and/or lenses, may be utilized to direct the interacted photons onto the image sensor. The interacted photons comprise one or more of photons absorbed by the target, photons reflected from the target, photons scattered by the target, or photons emitted by the target.

In some embodiments, at least one processor is included in the detection apparatus to execute programmed instructions stored in a memory of the detection apparatus for any number of the functions described an illustrated herein. The at least one processor of the multi target detection apparatus may include one or more central processing units (CPUs) or general purpose processors with one or more processing cores, for example, although other types of processor(s) can also be used.

The memory of the detection apparatus stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives (SSDs), flash memory, and/or any other computer readable medium which is read from and written to by a magnetic, optical, or other reading and writing system that is coupled to the processor(s), can be used for the memory In at least one embodiment, a detection apparatus includes at least two liquid crystal filters. The liquid crystal filters are configured so that they can each be independently tuned. In one embodiment, the two liquid crystal filters are operated in an oppositely polarized state. When the at least two liquid crystal filters are tuned to two different states, imagery that is formed by the interaction of the liquid crystal filters is collected by using one or two camera cameras. Because the two measurements are required to produce the score image are collected simultaneously, and because the score image forms the basis of target detection, it is possible to achieve detection at rates that approach the frame rate of at least one camera.

In some embodiments, the detection apparatus includes elements of a dual polarization conformal imaging apparatus. Dual polarization conformal imaging is described, for example, in U.S. Pat. No. 9,157,800 entitled "SYSTEM AND METHOD FOR ASSESSING ANALYTES USING CONFORMAL FILTERS AND DUAL POLARIZATION" to Priore et al., which was patented on Oct. 13, 2015, the entirety of which is incorporated by reference herein.

Referring now to FIG. 1 one embodiment of a multi-target detection apparatus is depicted, which is configured as a single camera, dual channel, and having dual polarization. The sample 30 is illuminated and/or excited by an illumination source 25. In FIG. 1, two independently tunable CF 42a, 42b along distinct orthogonal beam paths for the orthogonal components emerge from polarizing beamsplitter 72. In one embodiment, the CF comprises one or more of a multi-conjugate liquid crystal tunable filter, an acousto-optical tunable filter, a Lyot liquid crystal tunable filter, an Evans split-element liquid crystal tunable filter, a Solc liquid crystal tunable filter, a ferroelectric liquid crystal tunable filter, and a Fabry Perot liquid crystal tunable filter. In some embodiments, the CF comprises one or more a modified liquid crystal tunable filter and a liquid crystal tunable filter configured to operate in conjunction with a Look Up Table (LUT).

In this arrangement, the paths of the filtered beams are not parallel through the conformal filters 42a, 42b, but are directed by appropriate reflectors (e.g., mirrors) 76a, 76b to a beam combiner 78 (which may be a polarizing cube or polarizing beam splitter as illustrated) at which the orthogonal components, which can be at the same or different spectral shapes, are combined. In one embodiment, the components may be combined and directed to a detector 60 through a lens assembly 50. In another embodiment, the components may be kept separate as they are directed to the detector 60. However, the beam paths from one beam splitter 72 to the other 78 (via individual LCTFs 42a, 42b) may be made symmetrical to avoid, for example, the need for infinitely-corrected optics.

Still referring to FIG. 1, the detector 60 comprises a CCD detector. However, the present disclosure contemplates that the detector 60 may comprise other types of detectors including but not limited to: a CCD detector, a CMOS detector, an InGaAs detector, a platinum silicide (PtSi) detector, indium antimonide (InSb) detector, a mercury cadmium telluride (HgCdTe) detector, a colloidal quantum dot (CQD) detector, and combinations thereof. In some embodiments each or the combination of the above-listed detectors is a FPA detector. In some embodiments, each of the above detectors may include quantum dots to tune their bandgaps and/or alter sensitivity to different wavelengths.

In FIG. 1, the two conformal filters 42a, 42b may be tuned in unison using a conformal filter controller 82. It is possible to configure the controller 82 to independently tune the conformal filters 42a, 42b that respectively process orthogonal components of the input. Therefore, by appropriate control, the conformal filters can be tuned to the same spectral shape or to two different spectral shapes at the same time. The controller 82 may be programmable or implemented in software to allow a user to selectively tune each conformal filter 42a, 42b as desired.

In FIG. 1, a fast switching mechanism (not shown) may be provided to switch between the two views (or spectral images) corresponding to spectral data collected by the detector 60 from each of the conformal filters 42a, 42b. Alternatively, the two spectral views or images (from two separate conformal filters) may be combined or overlaid into a single image, for example, to increase contrast or intensity or for comparison purposes. The embodiment in FIG. 1 is shown to include a single CCD detector 60 to capture the filtered signals received from the conformal filters 42a, 42b.

Figure 2:
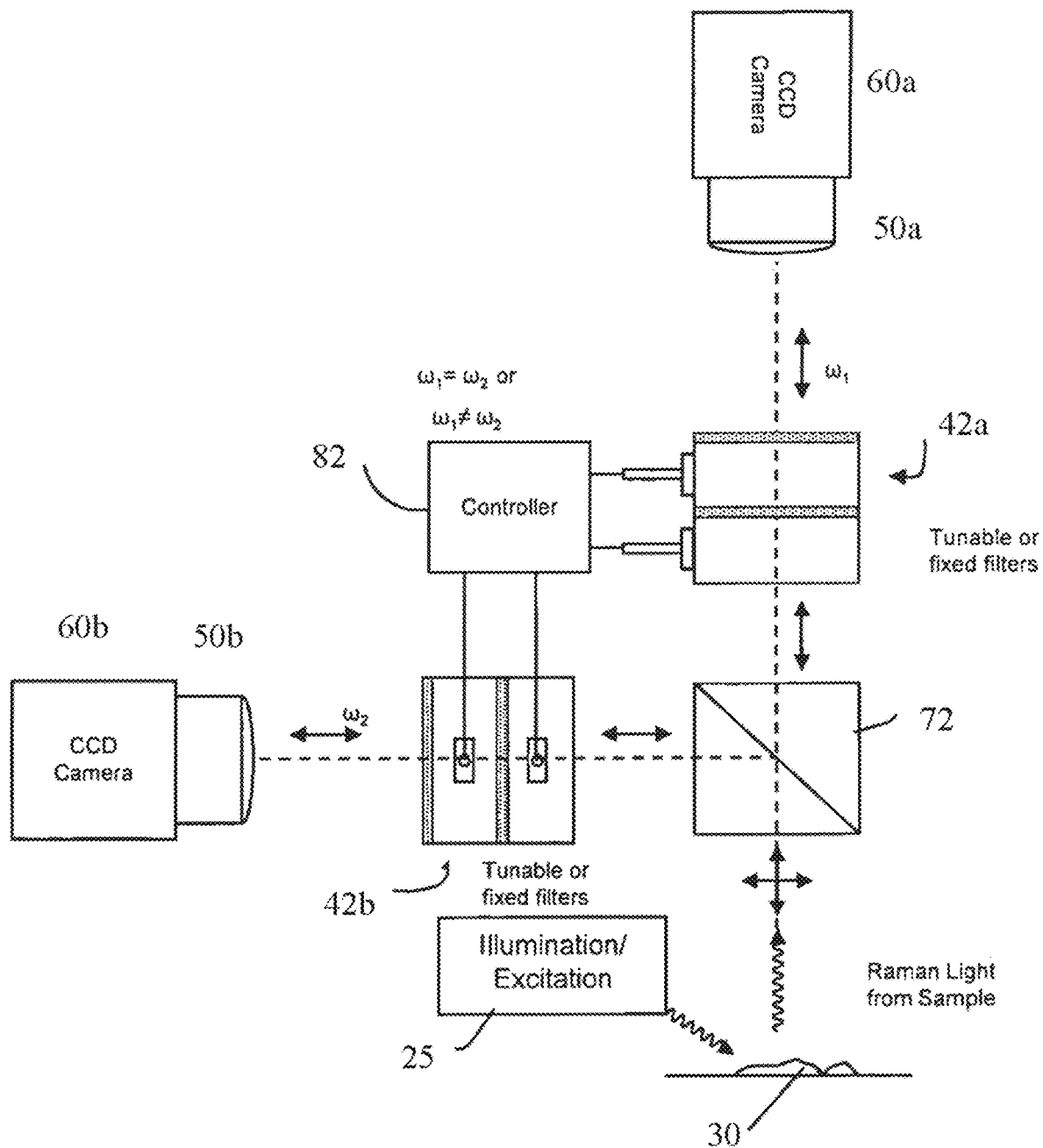
FIG. 2 depicts another embodiment of a detection apparatus, which is configured with dual cameras and dual channels in accordance with an embodiment.

In another embodiment, the reflectors 76a, 76b, and the beam combiner 78 may be removed, and two detectors may be used. An exemplary embodiment of such a configuration is illustrated in FIG. 2. Each detector 60a and 60b may be optically coupled to a corresponding one of the two conformal filters 42a, 42b to capture filtered signals from the conformal filters and to responsively generate electronic signals that enable display of spectral images of the illuminated sample 30. The present disclosure contemplates that any number of optical filters and associated detectors may be used to achieve the benefit of dual polarization as described herein.

In one embodiment, the two filtered signals may be detected simultaneously. As discussed herein, simultaneous detection of two different wavelengths holds potential for real-time detection when displayed in a non-overlapping configuration (side-by-side, top to bottom, etc.). In another embodiment, the two filtered signals may be detected sequentially.

It is noted here that although laser light may be coherent, the light received from the sample 30 (e.g., light emitted, scattered, absorbed, and/or reflected) and fed to the conformal filters 42a, 42b may not be coherent. Therefore, wavefront errors may not be present or may be substantially avoided in the two conformal filter versions in FIGS. 2 and 3 because of processing of non-coherent light by each conformal filter 42a, 42b.

Figure 3:
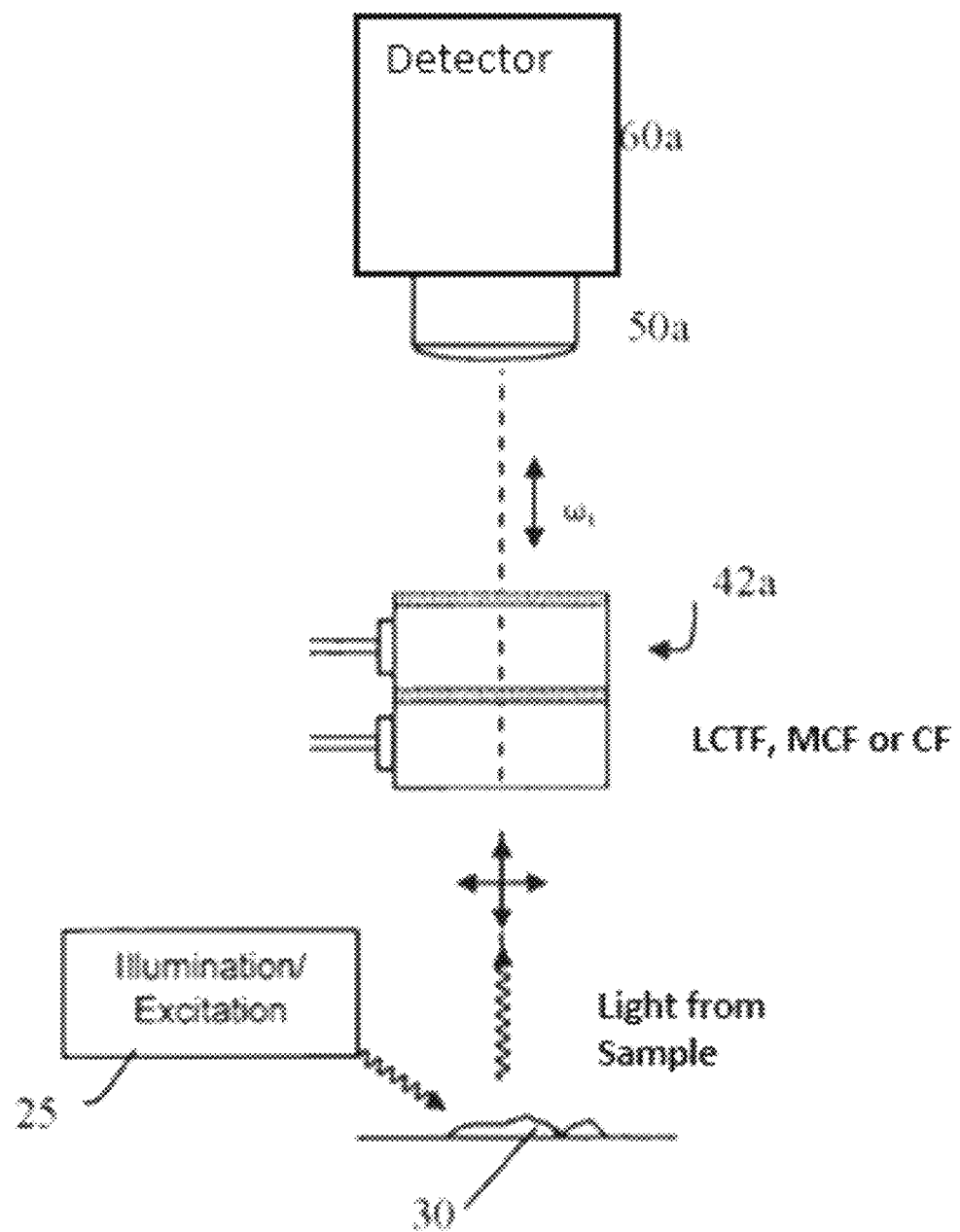
FIG. 3 depicts another embodiment of a detection apparatus, which is configured with a single camera and a single channel in accordance with an embodiment.

In another embodiment, a single camera, single channel apparatus operates in single polarization, as depicted in FIG. 3, which includes only a single detector 60a and filter 42a to analyze the light from sample 30 that is illuminate by photons that are generated by illumination source 25.

The result of detection is that at least one image is generated. In some embodiments, the image is a wide field hyperspectral image generated from photons that have interacted with a sample, such as a suspect mailpiece. Such a hyperspectral image would include information from each wavelength of light that interacted with the sample. In some embodiments, the image is a wide field image that includes one or more wavelengths that are selected for their reflectance or absorbance by a pre-selected target substance. In some embodiments where the target substances are expected to be present in low concentrations, the wavelengths are selected for their absorbance by the target substance.

Image Processing

After the images are generated by the detection apparatus, the images are processed to distinguish drugs or other contraband substances from the background. Image processing includes three parts: score image generation, anomaly detection, and false positive reduction by way of a neural network.

A score image is generated by processing the image information from detection. Although the selection of particular wavelengths of light that correspond to a target substance eliminates many false positive results, there is still the possibility of false positive results that must be minimized or eliminated. In some cases, background materials of mailpieces may absorb or reflect wavelengths that correspond to those of target substances. Thus, the score image may include mathematical information corresponding to both the background material and the target substance. Despite the response in the score image, the shape or context within the image may allow false detections to be excluded using processing techniques, such as machine learning algorithms, neural networks, and/or the like, that are trained to classify each anomaly as described further below.

After score image generation, preprocessing on the score image is performed to prepare the sample for the anomaly detection. During preprocessing, noise reduction is performed by removing isolated outlier pixels. These outlier pixels, if left in the score image, may negatively impact subsequent processing. After noise reduction, substrate flat fielding is performed to remove the effects of the background lighting that is used to inspect the mailpiece. In some embodiments, this background lighting is a lighted base on which the mailpiece is placed for inspection. Without correction, the non-uniform contrast of lighting may introduce false information in the score image, causing false positive identification of target substances.

In some embodiments, the flat field lighting correction is performed by treating a scan of blank page of uniform thickness as a flat-field and removing the effects of the light. This is achieved using the equation below:

$$I_c = m_F \frac{I}{F}$$

where $I_c$ is the corrected image, $m_F$ is the mean of the flat field F, and I is the original image.

During another step of preprocessing, any holes or missing material in the mailpiece are identified and filled so that these areas are excluded from the search for target substances. Holes may result from other testing that is performed on the mailpiece and/or because incoming mailpieces may comprise notebook paper or torn paper. Hole detection and filling is useful to prevent false positives that would otherwise arise from the high contrast between the mailpiece and the lighted background. Hole detection is achieved by matching high intensity pixels to the uncovered area around the piece of mail on a monochromatic image.

The final step of preprocessing is image orientation and cropping. During image orientation and cropping, the score image is processed to ensure that only parts of the image that include the mailpiece are included for subsequent image processing. Outer portions and any other parts of the score image that do not correspond to the mailpiece are excluded from analysis to reduce the number of false positives that result from contrast differences between the mailpiece and the device background. In some embodiments, the score image is rotated to a pre-selected orientation to further ensure image uniformity.

Figure 4A:
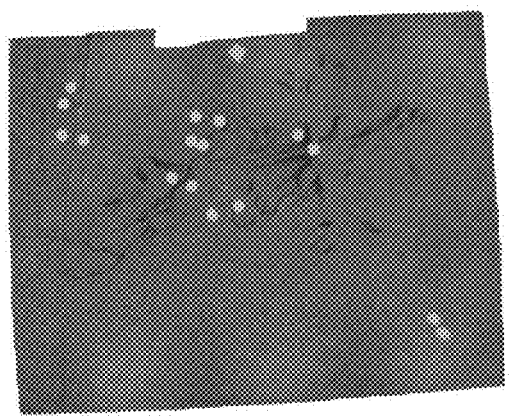
FIG. 4A depicts a score image prior to performing any preprocessing in accordance with an embodiment.
Figure 4B:
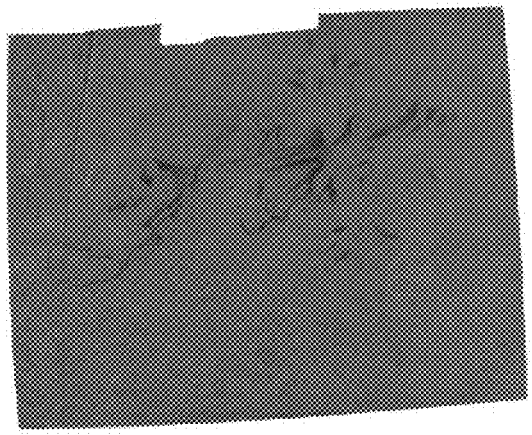
FIG. 4B depicts a score image after performing preprocessing steps of removing isolated outlier pixels, substrate flat fielding, and hole detection and filling, but before cropping and image orientation in accordance with an embodiment.
Figure 4C:
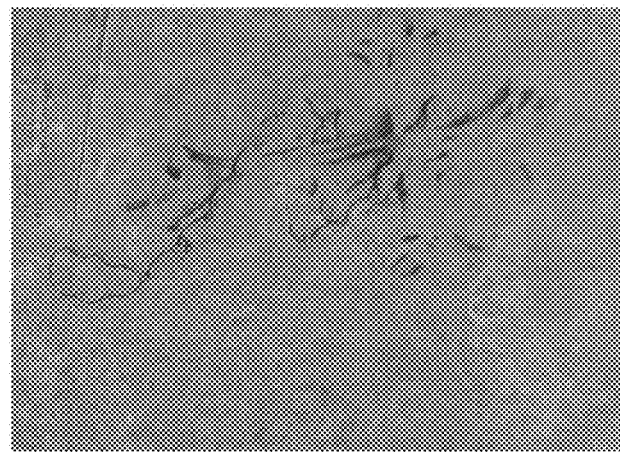
FIG. 4C depicts a score image after performing all preprocessing steps, including removing isolated outlier pixels, substrate flat fielding, hole detection and filling, and cropping and image orientation in accordance with an embodiment.

The results of the different steps of preprocessing are shown in FIGS. 4A-4C. FIG. 4A shows a score image before any preprocessing is performed. FIG. 4B shows a score image after performing the preprocessing steps of removing isolated outlier pixels, substrate flat fielding, and hole detection and filling, but before performing cropping and image orientation. FIG. 4C shows a score image that has completed all preprocessing steps, including removing isolated outlier pixels, substrate flat fielding, hole detection and filling, and cropping and image orientation.

Anomaly Detection

After performing preprocessing steps, anomaly detection may be performed. A first stage of anomaly detection may include mask extraction. During mask extraction, text and graphics are detected and removed from the score image. The contrast between text, graphics, or the like can appear similar to a stain of a target substance. As such, mask extraction removes these confusants prior to determining whether drugs or other contraband substances are present in a mailpiece.

The techniques for detecting text, graphics, or the like are not limited. In some embodiments, an expansion of text detection adaptive thresholding techniques may be used to detect text, graphics, or the like. For example, Niblack's approach or Sauvola's approach may be performed. Both of these approaches used use local mean and standard deviation to identify graphics and text.

In some embodiments, Bataineh's approach may be used for graphic detection which may include dynamic local window selection. In particular, Bataineh's approach may be used to adapt to graphic and text of different sizes and thicknesses. Unlike text detection applications where the expected text size and thickness is regular and known, the mask extraction uses dynamic windows to obtain accurate detections without the need for manual parameter adjustments. An adaptive threshold may be found using the following equation:

$$T_W = m_W - \frac{\sigma_W m_W^2}{(m_g + \sigma_W)(\sigma_a + \sigma_W)}$$

where $T_W$ is the threshold value for a local window W, $m_W$ is the mean value within the local window, $\sigma_W$ is the standard deviation within the local window, $m_g$ is the global mean of the image, and $\sigma_a$ is the adaptive standard deviation value. For each image pixel, a dynamic local window W may be selected based on certain global image properties. Bataineh's approach may be used to select local windows which would otherwise be deemed inappropriate for graphic detection. After a local window is determined for a pixel, the threshold is determined using the above-listed equation. While other thresholding methods may have succeed in resolving some images, the modified Bataineh thresholding method obtains appropriate graphic detection with fewer false pixels for a wider variety of images without the need for manual adjustment of window size or other factors.

A graphics mask is obtained by applying the local threshold to the score image and is expanded by active contouring and determining strong edge features. Active contouring segments the score image using the initial graphic detection as an initial state. In some embodiments, the segment may be created using the Chen-Vese active contour method. In some embodiments, the Canny edge filter method may be used to determine strong edge features within the score image.

For locations within an image having significant overlap between the detected edge and the graphic mask, the detected edge segment may be added to the graphic mask for a more complete coverage of the graphic. Morphological operations may be used to clean up the mask. An inpainting method, such as Ntirogiannis thresholding, may be applied to the final graphics mask to remove graphics. Ntirogiannis thresholding may generate four inpainted images found by filling masked pixels using a local unmasked mean started from the four corners of the image. The score image may be filled using local paper pixels surrounding the graphic.

Figure 5A:
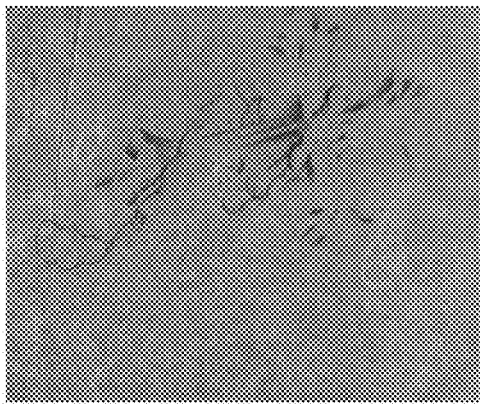
FIG. 5A depicts an original score image for a particular mailpiece in accordance with an embodiment.
Figure 5B:
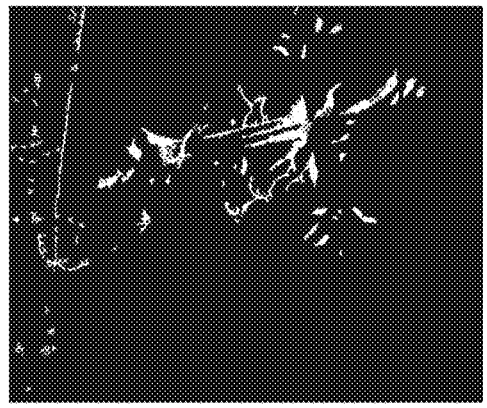
FIG. 5B depicts a thresholded graphic detection mask resulting from the original score image in accordance with an embodiment.
Figure 5C:
FIG. 5C depicts a final graphic detection mask in accordance with an embodiment.
Figure 5D:
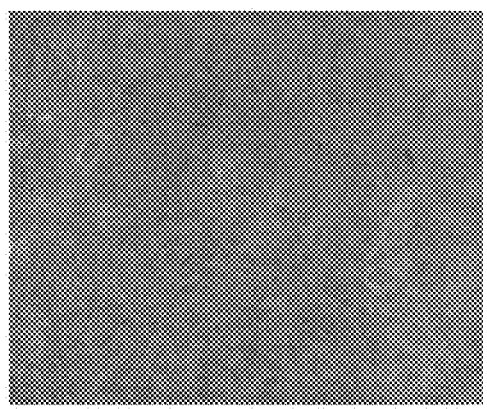
FIG. 5D depicts a final inpainted score image resulting in accordance with an embodiment.

FIGS. 5A-D depict the score image during various stages of an illustrative graphic removal process. FIG. 5A depicts an original score image for a particular mailpiece in accordance with an embodiment. As shown in FIG. 5A, strong stains within the score image are circled in red. FIG. 5B depicts a thresholded graphic detection mask resulting from the original score image using Bataineh's thresholding technique. FIG. 5C depicts a final graphic detection mask resulting from the application of the Chen-Vese active contour method and the Canny edge filter method. FIG. 5D depicts a final inpainted score image resulting from the application of the Ntirogiannis thresholding method to the score image. As shown, the graphic of FIG. 5A is successfully removed in FIG. 5D without effecting the stained portion of the image.

Anomaly detection may be performed on the score image with removed graphics. Anomaly detection may be performed by determining the multi-scale Frangi filter response. A Frangi filter is a spatial filter that is used to identify long, thin tubes and edges within an image, which has been found to correlate with drug stain patterns. The Frangi response may be binarized using a fuzzy c-means algorithm in conjunction with a threshold. Potential stain candidates may be filtered using various criteria. For example, any stain candidates that significantly overlap with the graphic mask area may be removed from consideration. However, such filtering criteria may or may not be used in a particular embodiment.

A score may be determined for each candidate particle using a number of measurements, such as a local signal-to-noise ratio (SNR), a mean Frangi response strength, and/or a normalized area. A weighted sum of these measurements may be determined for each candidate particle. Candidate particles for which the weighted sum exceeds a score threshold may be considered to be a valid anomaly. If no particles are found in the initial search, large scale anomalies may be searched for by using an increased set of Frangi scales. In one embodiment, the candidate score, $S_i$, for a particle, i, may be calculated using the following equation:

$$S_i = \alpha_1 \text{SNR}_{local,i} + \alpha_2 v_{mean,i} + \alpha_3 A_{N,i}$$

where the weights $\alpha$ are set to equal weighting, $\text{SNR}_{local,i}$ is the local SNR value for candidate i, $v_{mean,i}$ is the mean Frangi response for candidate i, and $A_{N,i}$ is the normalized area for candidate i. These metrics may ensure that the candidate particle has a sufficiently high local SNR, a sufficiently high Frangi response, and is within an acceptable size range to be a valid candidate. In some embodiments, different parameters and thresholds may be selected based on the stains in the training dataset.

Anomaly Classification

Once confusants such as text, graphics, images or the like are detected and removed from the score image, a trained network may be used to classify anomalies as drug or non-drug based on whether the anomalies are a stain or not. In an embodiment, a two-class classifier may be trained to define each anomaly particle. The training process is discussed in more detail below.

Figure 6:
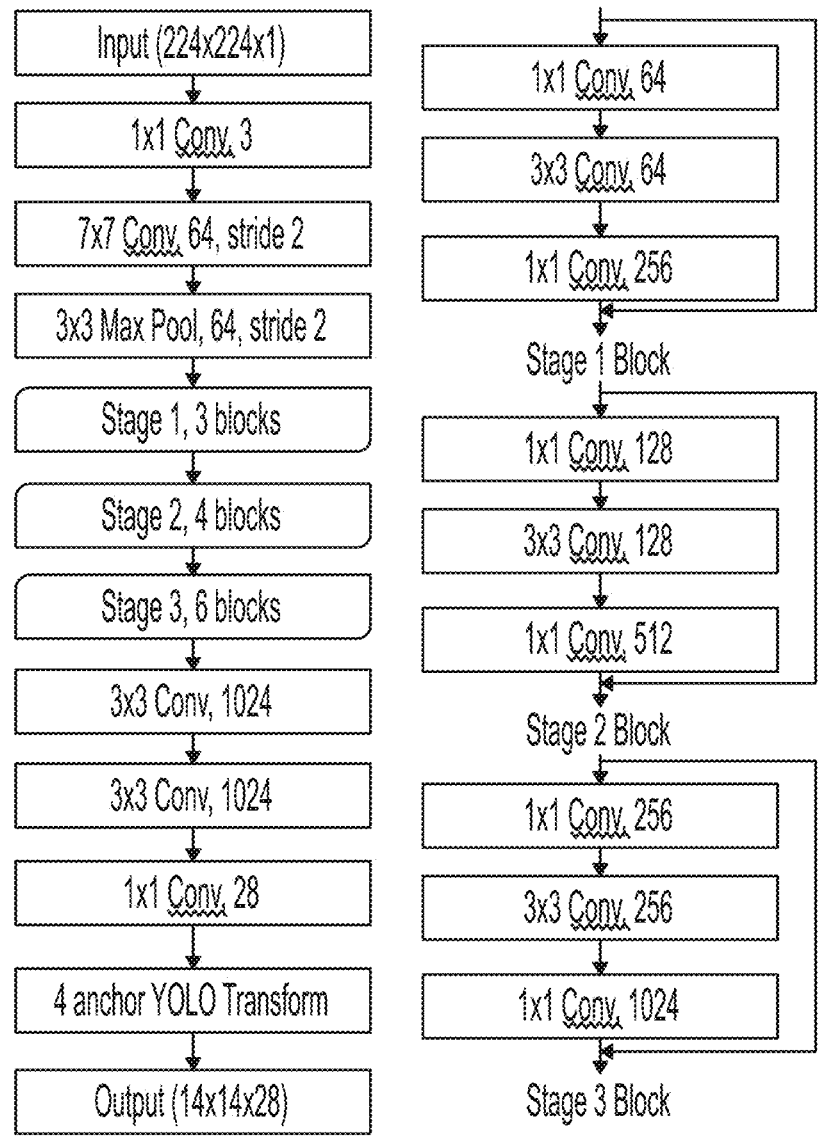
FIG. 6 depicts an illustrative block diagram of a detection network architecture in accordance with an embodiment.

A suitable detection algorithm may be chosen as the basis for the network architecture based on accuracy, classification speed, and training requirements. In an embodiment, the You Only Look Once (YOLO) detector, developed by J. Redmon and A. Farhadi and disclosed in the Proceedings of the 2017 IEEE Conference on Computer Vision and Pattern Recognition (CVPR), may be used as the detection algorithm. A depiction of the network architecture is illustrated in FIG. 6.

The detector may include multiple anchor boxes that directly predict the bounding box of a target image using fully connected layers in concert with a convolutional feature extractor. The input layers may take in, for example and without limitation, a 224×224 grayscale image and use a 1×1×1 convolutional layer to create a three channel input. The convolutional feature extractor may include, for example and without limitation, a 140 layer residual network having three stages of feature extraction. Each stage may include multiple residual learning blocks.

Deep residual networks may allow for deep networks to be more easily optimized while gaining accuracy from an increase in network depth. In the embodiment depicted in FIG. 6, each block may include an identity shortcut connection in parallel with a set of three convolutional layers in a bottleneck design. In the embodiment, the three convolutional layers may include 1×1, 3×3, and 1×1 convolutions that reduce dimensions, process in the lower dimensions, and restore dimensions for the purpose of reduced training time, respectively. Between each stage, downsampling may be performed by the convolutional layer with a stride of two.

In an embodiment, the remaining layers of the network may include additional convolutional layers with the output layers. The output of the class convolution may be 14×14× 28 to represent the 14×14 set of cells for the output feature map. In the transform layer, the data may be reshaped to 196×4×7, where each of the 196 cells includes 4 anchor boxes each having 7 parameters. The parameters for each anchor box may be transformed to represent the intersection over union (IOU) prediction score, X and Y coordinate prediction, and width and height prediction parameters and the class probabilities may be computed using the softmax. The output of the detector may include 784 bounding boxes that each include a set of coordinates and a confidence score used to determine whether the prediction box is sufficiently accurate to determine stain from non-stain.

The bounding boxes may be pruned so that only valid boxes are used to predict the target particle's class. In some embodiments, boxes with an invalid size or location may be removed. In some embodiments, only boxes having a confidence score above a threshold may be retained to ensure that weak predictions do not contribute to a misclassification. In such embodiments, a minimum confidence score may be chosen, based on the testing dataset, to remove very low confidence boxes while retaining enough boxes to make a prediction.

A prediction may be calculated for each candidate particle using the remaining prediction boxes. In an embodiment, the number of pixels in which a prediction box overlaps with a candidate particle may be counted for each candidate particle. Using the total pixel counts for stain and non-stain, the class may be assigned using, for example and without limitation, a majority rule. If the total pixel count for the two classes are the same or if no prediction boxes can define the candidate particle, the candidate particle may be classified as a drug stain to ensure that an unknown particle is flagged.

Figure 7A:
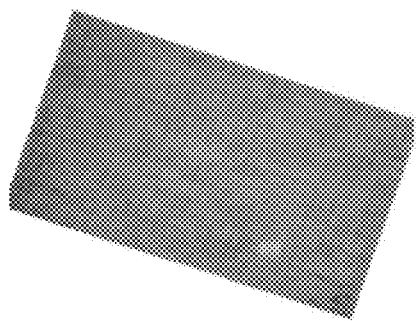
FIGS. 7A and 7B depict visible light and detection images for a drug sample in accordance with an embodiment (true positive highlighted in green in FIG. 7B).
Figure 7B:
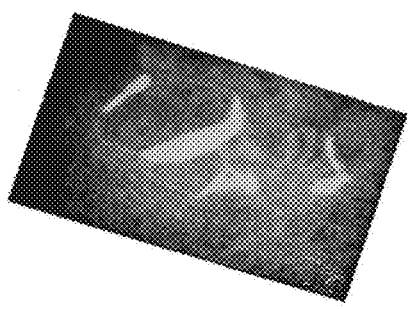
Figure 8A:
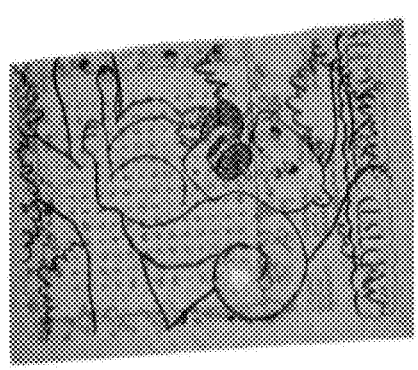
FIGS. 8A and 8B depict visible light and detection images for a non-drug sample in accordance with an embodiment.
Figure 8B:
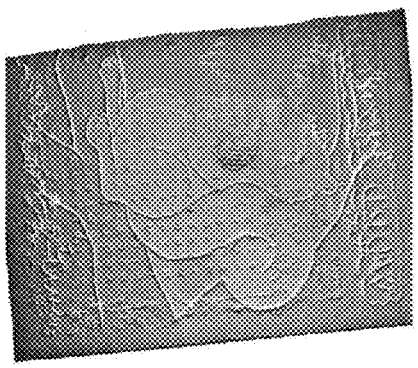

FIGS. 7A and 7B depict visible light and detection images for a drug sample in accordance with an embodiment (true positive highlighted in green). FIGS. 8A and 8B depict visible light and detection images for a non-drug sample in accordance with an embodiment.

In certain embodiments, systems are disclosed which, during operation, perform one or more of the steps described herein. Such systems include at least one processor to execute programmed instructions stored in a memory for any number of the functions described and illustrated herein. The at least one processor of the system apparatus may include one or more central processing units (CPUs) or general purpose processors with one or more processing cores, for example, although other types of processor(s) can also be used. In certain embodiments, the processor includes portions configured to behave as a neural network.

A memory stores programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives (SSDs), flash memory, and/or any other computer readable medium which is read from and written to by a magnetic, optical, or other reading and writing system that is coupled to the processor(s), can be used for the memory. In certain embodiments, the memory is non-transitory and readable by a computer.

EXAMPLES

Example 1: Classifier Training

A classifier was trained using 10249 labeled boxes from a total of 1678 score images (85% augmented data). The labeled boxes were selected to represent known stained or unstained portions of mailpieces. The non-drug patches included common aspects that cause false detections, such as envelope glue, stamps, tape, graphics, and text. The drug patches included stains at different concentrations, sizes, and orientations. Data augmentation was performed using translation, scale change, mirroring, flipping, blurring, and rotation. The network weights were initialized using a pretrained network and trained using 50 epochs with a minimum batch size of 16 and an initial learning rate of 0.001. The trained network was test on 4391 labeled boxes. The results of this testing achieved a stain bounding box classification accuracy rate of 99.6% and is able to differentiate envelope patterns from stain patterns even if the two patterns have similar score values and/or sizes.

Example 2: Drug Detection Framework

A dataset including 174 drug stained image samples (including 42 real-world and 132 in-house drug image samples) and 215 in-house non-drug image samples (including blank paper and paper sprayed or soaked with coffee, acetone, and/or water) was collected as an initial testing set. A detector designed in accordance with the teachings hereinabove achieved a probability of detection (PD) of 87.4% on the 174 drug-stained samples. A probability of false alarm (PFA) was significantly higher when the classifier was not used. Without using the classifier, the PFA was 29.3% for the non-drug samples. When the classifier was used, the PFA was 7.0%. This example indicates the importance of the classification step for removing false positive detections.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 units refers to groups having 1, 2, or 3 units. Similarly, a group having 1-5 units refers to groups having 1, 2, 3, 4, or 5 units, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of distinguishing a target from a background in a sample, the method comprising:
    generating a score image from a hyperspectral image, the hyperspectral image having been formed from photons that have interacted with a sample that includes the target and the background;
    preprocessing the score image, the preprocessing comprising:
        removing isolated outlier pixels from the score image,
        performing substrate flat fielding of the score image,
        performing hole detection and filling for the score image,
        preforming image orientation of the score image, and
        cropping the score image;
    performing anomaly detection on the score image to remove confusants and identify one or more anomalies in the score image, the confusants including one or more of text, graphics, or images; and
    classifying one or more anomalies as target or non-target.

2. The method of claim 1, wherein the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

3. The method of claim 2, wherein the target is a drug and the non-target is a substance that is not a drug.

4. The method of claim 1, wherein the text, graphics, or images are removed by one or more of Niblack's approach, Sauvola's approach, or Bataineh's approach.

5. The method of claim 1, wherein classifying is performed with a trained neural network.

6. The method of claim 1, wherein classifying is performed based on a You Only Look Once (YOLO) detector.

7. A system for distinguishing a target from a background in a sample, the system comprising a processor and a non-transitory computer readable medium that when executed, causes the processor to:

generate a score image from a hyperspectral image, the hyperspectral image having been formed from photons that have interacted with a sample that includes the target and the background;

preprocess the score image by removing isolated outlier pixels from the score image, performing substrate flat fielding of the score image, performing hole detection and filling for the score image, performing image orientation of the score image, and cropping the score image;

perform anomaly detection on the score image to remove confusants and identify one or more anomalies in the score image, the confusants including one or more of text, graphics, or images; and classify one or more anomalies as target or non-target.

8. The system of claim 7, wherein the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

9. The system of claim 8, wherein the target is a drug and the non-target is a substance that is not a drug.

10. The system of claim 7, wherein the text, graphics, or images are removed by one or more of Niblack's approach, Sauvola's approach, or Bataineh's approach.

11. The system of claim 7, wherein the processor classifies the one or more anomalies with a trained neural network.

12. The system of claim 7, wherein the processor classifies the one or more anomalies based on a You Only Look Once (YOLO) detector.

13. A method of distinguishing a target from a background in a sample, the method comprising:

forming a hyperspectral image from photons that have interacted with a sample that includes the target and the background;

generating a score image from the hyperspectral image;

preprocessing the score image, the preprocessing comprising:

removing isolated outlier pixels from the score image,
performing substrate flat fielding of the score image,
performing hole detection and filling for the score image,
performing image orientation of the score image, and cropping the score image;

performing anomaly detection on the score image to remove confusants and identify one or more anomalies in the score image, the confusants including one or more of text, graphics, or images; and classifying one or more anomalies as target or non-target.

14. The method of claim 13, wherein the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

15. The method of claim 14, wherein the target is a drug and the non-target is a substance that is not a drug.

16. The method of claim 13, wherein the text, graphics, or images are removed by one or more of Niblack's approach, Sauvola's approach, or Bataineh's approach.

17. The method of claim 13, wherein classifying is performed with a trained neural network.

18. The method of claim 13, wherein classifying is performed based on a You Only Look Once (YOLO) detector.

19. A system for distinguishing a target from a background in a sample, the system comprising a processor and a non-transitory computer readable medium that when executed, causes the processor to:

form a hyperspectral image from photons that have interacted with a sample that includes the target and the background;

generate a score image from the hyperspectral image;

preprocess the score image by removing isolated outlier pixels from the score image, performing substrate flat fielding of the score image, performing hole detection and filling for the score image, performing image orientation of the score image, and cropping the score image, perform anomaly detection on the score image to remove confusants and identify one or more anomalies in the score image, the confusants including one or more of text, graphics, or images; and classify one or more anomalies as target or non-target.

20. The system of claim 19, wherein the target is one or more of body tissues, body fluids, explosives, drugs, toxins, fruit, cheese, meat, alcohol, flavor compounds, Chemical Warfare Agents (CWA), Toxic Industrial Chemicals (TIC), or Non-Traditional Agents (NTA).

21. The system of claim 20, wherein the target is a drug and the non-target is a substance that is not a drug.

22. The system of claim 19, wherein the text, graphics, or images are removed by one or more of Niblack's approach, Sauvola's approach, or Bataineh's approach.

23. The system of claim 19, wherein the processor classifies the one or more anomalies with a trained neural network.

24. The system of claim 19, wherein the processor classifies the one or more anomalies based on a You Only Look Once (YOLO) detector.

* * * * *